United States Patent [19]

Horwitz

[11] Patent Number: 4,618,214
[45] Date of Patent: Oct. 21, 1986

[54] METHOD OF FABRICATING A CONTROLLED HARMONIC BINARY GRATING

[75] Inventor: Bruce A. Horwitz, Newton Centre, Mass.

[73] Assignee: Itek Corporation, Lexington, Mass.

[21] Appl. No.: 665,255

[22] Filed: Oct. 26, 1984

[51] Int. Cl.$^4$ .............................................. G02B 5/18
[52] U.S. Cl. .................................. 350/162.2; 350/320
[58] Field of Search ............................. 350/162.2, 320

[56] References Cited

U.S. PATENT DOCUMENTS 4,184,746  1/1980  Coale .................................. 350/162.2

Primary Examiner—Bruce Y. Arnold
Attorney, Agent, or Firm—Michael H. Wallach; Robert F. Rotella

[57] ABSTRACT

A method of fabricating a controlled harmonic grating having both binary magnitude and phase transmissions in which specified harmonics are enhanced and/or suppressed. The summing of a number of binary pulse trains produces a controlled harmonic grating transmission function. The binary grating is readily fabricated by applying strips of light blocking material corresponding to the occurrence of a zero value of the transmission function, and by forming light-transmissive strips coincident with the portions of the transmission function having an absolute value of 1. Strips of phase retarding material are also deposited having a relative phase shift of pi radians.

19 Claims, 6 Drawing Figures

METHOD OF FABRICATING A CONTROLLED HARMONIC BINARY GRATING

The Government has rights in this invention pursuant to Contract F30602-81-C-0301 with TRW (Itek subcontract M17970LK1S), awarded by the Rome Air Development Center, Department of the Air Force.

BACKGROUND OF THE INVENTION

The present invention relates to the field of diffraction gratings.

For certain uses, it is desirable to select or specify the harmonic content of a diffraction grating. As an example, in a grating-based shearing interferometer it could be desirable to have the plus and minus first harmonics only. Those skilled in the art will recognize that a grating with plus and minus first orders only, has a true sine function amplitude transmission, and similarly will recognize that such a grating is difficult to fabricate because of the requisite continuously varying magnitude transmission and infinitely sharp phase transmission function transitions.

It is thus an object of the present invention to provide a method of designing a controlled harmonic grating (having both binary magnitude and phase transmissions) in which specified harmonics are enhanced and/or suppressed, to eliminate the above stated difficulties involved in fabricating continuous gratings such as true sinusoidal gratings.

It is a further object of the present intention to provide an easy method of fabricating this type of grating due to the binary constraints applied.

It is a further object of the present invention to fabricate a grating having a binary magnitude transmission function which may be conveniently created by means of applying metal, coated through etched photo resist, together with a phase function which may be created by the application of an appropriate phase retarding material, such as silicon dioxide, also deposited through a photo resist.

SUMMARY OF AN EMBODIMENT OF THE INVENTION

The invention involves providing a number of binary pulse trains which, when analytically summed, produce a controlled harmonic grating (CHG) transmission function having selected harmonics suppressed and/or enhanced. In contrast with the production of a true sinusoidal grating, the binary grating is readily fabricated by applying strips of light blocking materials coincident with the occurrence of a 0 value of the CHG transmission function, and having light transmissive strips coincident with the portions of the transmission function having an absolute value of 1. Strips of phase retarding material are also deposited coincident with portions of the grating having a phase shift of pi radians. Ease of fabrication of the grating is enhanced by positioning the phase retarding material over the grating so that the somewhat irregular edge portions of the phase retarding material are coincident with the light blocking portions of the grating. The pulse widths of the binary pulse trains to be summed, to produce the grating transmission function, are derived by setting up a plurality of simultaneous equations and setting them equal to 0 for each order to be suppressed, and to a maximum for each order to be enhanced.

Other objects, features and advantages of the present invention become apparent upon study of the following specific description taken in conjunction with the drawings in which.

SPECIFIC DESCRIPTION

Figure 1:
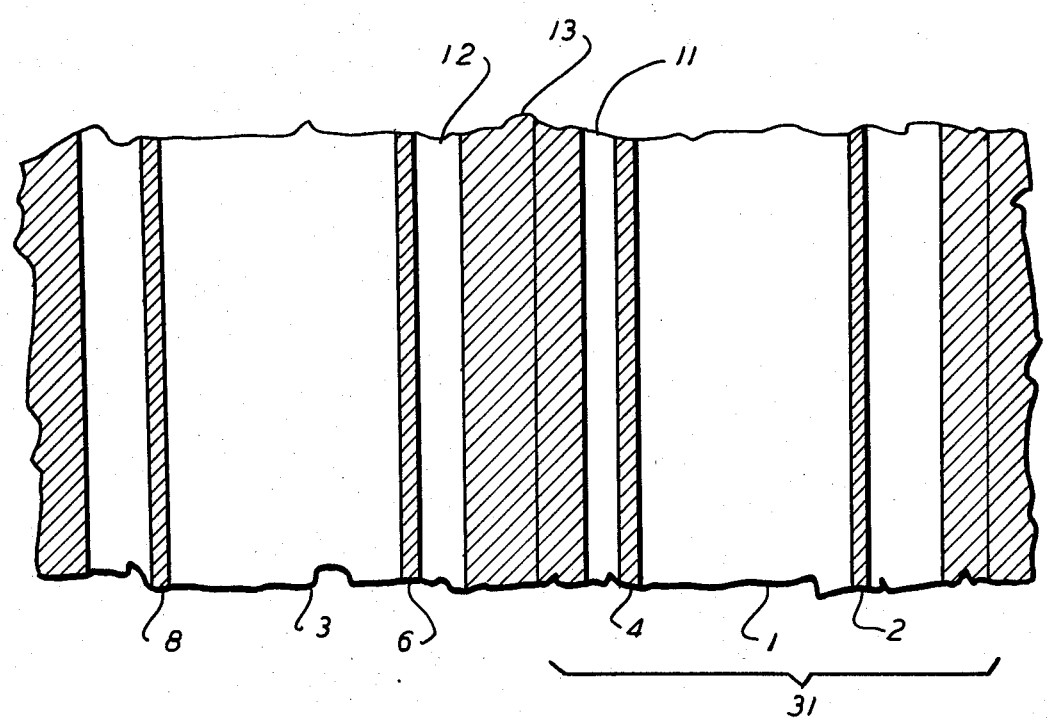
FIG. 1 illustrates a plan view of a small portion of a typical binary grating constructed in accordance with the method of the invention.

The method of producing a specific grating will be described first, followed by a generalized statement of the method of the invention.

The inventor had a grating constructed having the third, fifth and seventh harmonics or orders suppressed to within the fabrication tolerances applied, along with the even harmonics. In the grating portion of FIG. 1, light transmitting regions 1 and 3 are illustrated having narrow opaque strips 2, 4, 6, 8, bordering the areas 1 and 3. Between areas 1 and 3 light transmitting regions 11 and 12 were also produced having opaque region 13 positioned therebetween, as also illustrated in the Figure.

Figure 2:
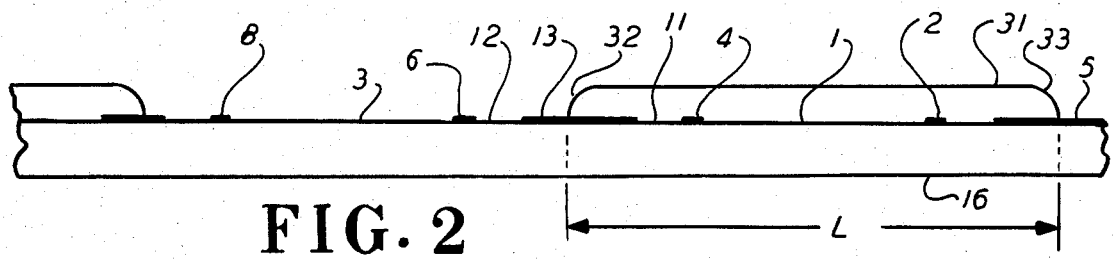
FIG. 2 illustrates schematically a side view of such grating.

The opaque areas shown in FIG. 2 are produced by conventional photo etch techniques, described below, which result in the formation of both narrow and wide light blocking or opaque strips. For example, the narrower metallized opaque strips 4 and 6, illustrated in FIG. 1, are shown in FIG. 2, the relatively narrow light transmissive strips 11 and 12 also being shown.

Figure 3A:
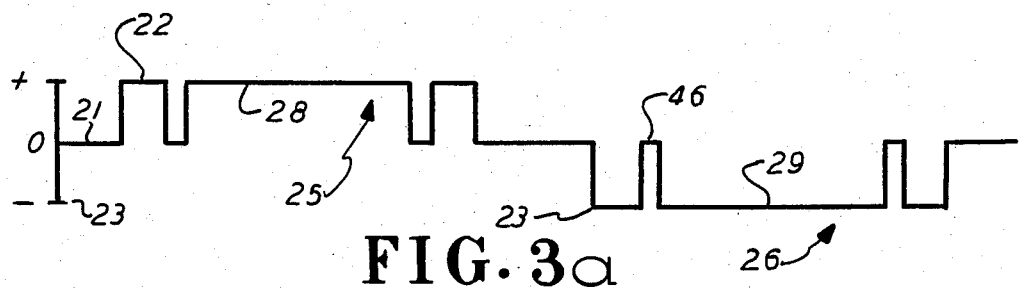
FIG. 3a illustrates the controlled harmonic grating (CHG) transmission function utilized to fabricate the grating.

Referring now to FIG. 3a, the controlled harmonic grating transmission function is illustrated having three levels. Level 21 indicates the absence of light transmission for the opaque condition, whereas level 22 indicates a +1 light amplitude transmission or a full transparency, whereas level 23 represents a −1 light amplitude transmission condition which is 180° or pi radians out of phase with the +1 light amplitude condition of level 22. Since the intensity of light transmitted is proportional to the absolute value of the amplitude squared, the grating produced in accordance with the function of FIG. 3a will be transparent for both +1 and −1 light amplitude conditions represented by +1 level 22 and −1 level 23. However, the phase of the light transmitted by the −1 amplitude transmission condition illustrated in region 26, will be shifted by pi radians relative to the phase of the +1 amplitude light transmitted at region 25.

It may now be noted that the 0 value portions of the function of FIG. 3a coincide with the opaque strips of FIG. 2, and the +1 value portions coincide with the open regions of FIG. 2. The +1 value portion 28 of the function of FIG. 3a coincides with the light transmitting area 3, whereas portion 29 also coincides with the light transmitting area 1 of the grating illustrated in FIG. 2. However, since the amplitude sign is minus across portion 26, a pi radian phase shift is required, and such is provided by a strip 31 of phase retarding material eg., silicon dioxide, applied over the grating as shown. The substrate 16 may be of glass.

It may be noted that the sloping sides 32 and 33 of the phase retarding strip 31 are coincident with the opaque strips 5 and 13 of the grating. The often somewhat irregular shape of the edge slopes of the phase retarding strips are of no importance since they overlay opaque strips of the grating, thereby to eliminate any adverse effects on the light due to departures of the retarding strip edges from the ideal squared-up edges, and thus fabrication is simplified.

Figure 3B:
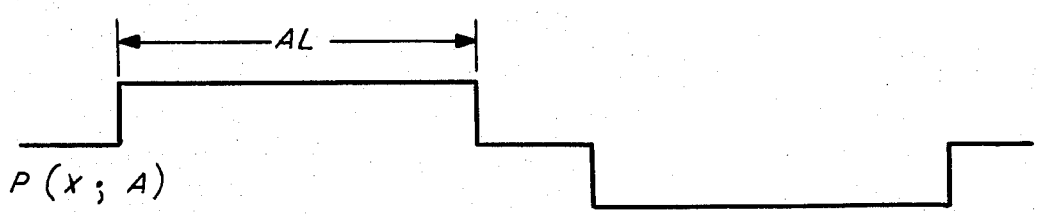
FIGS. 3b through 3d illustrate a plurality of exemplary binary pulse trains which are analytically summed to produce the CHG transmission function.
Figure 3C:
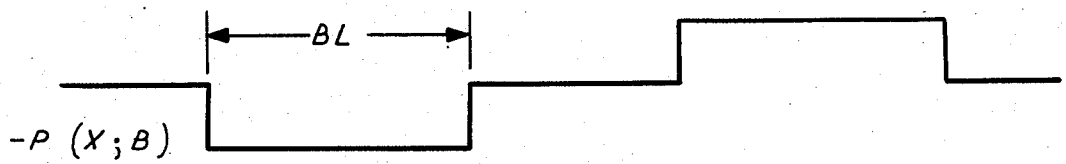
Figure 3D:
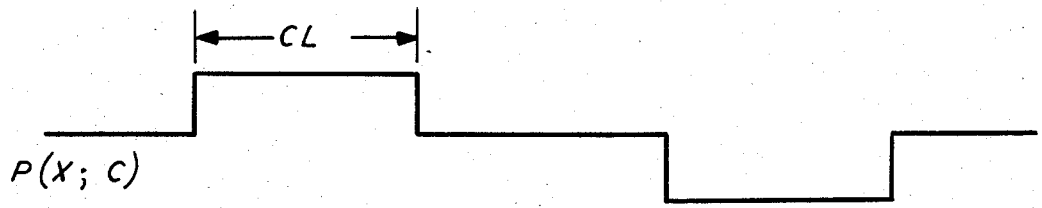

The half period of the transmission function of FIG. 3a is defined by the capital letter L and the pulse width of the first binary pulse train utilized to synthesize the transmission function is defined by AL where A is a number between 0 and 1 which, when multiplied by L, will produce a pulse width AL, which defines the pulse train of FIG. 3b. The pulse width BL of the pulse train of FIG. 3c is, by definition, a lesser amount defined by a second lesser constant B having a value between 0 and 1, and likewise with respect to pulse width CL indicated in FIG. 3d. The three pulse trains of FIG. 3b, 3c, and 3d are summed to produce the harmonic grating transmission function of FIG. 3a for the particular example, whereby the third, fifth and seventh harmonics are completely suppressed.

A grating was produced in accordance with the method of the invention. The desired values of A, B, and C were derived from a computer search. The fabricated grating achieved these values to within a 1 percent tolerance. The values were:

| Desired | Achieved |
|---|---|
| A = .7475031 | .746 |
| B = .5794732 | .583 |
| C = .4797674 | .478 |

The fabricated grating was coated with silicon dioxide to produce the desired pi radian phase shift. The achieved phase shift (for light at 632.8 nanometers) was 9 percent greater than desired.

A grating produced with the desired values of A, B, and C and with a pi radian phase shift will suppress the third, fifth, and seventh harmonics completely, as well as all even harmonics. The energy diffracted into the other orders is easily calculated using the Fourier transformation. The measured harmonic strengths for the fabricated grating can be compared with these calculated values:

| Harmonic | Relative Energy | |
| | Ideal | Measured |
|---|---|---|
| 1 | 1.0 | 1.0 |
| 3 | 0.0 | .0009 |
| 5 | 0.0 | .0005 |
| 7 | 0.0 | .0 |
| 9 | .0349 | .0318 |
| 11 | .0403 | .0398 |
| 13 | .0048 | .0059 |
| 15 | .0516 | .0510 |
| 17 | .0043 | .0040 |

It may be seen by inspection that the summation of the pulse trains of FIG. 3b through 3d produce the grating function of FIG. 3a. For example, the opaque strip corresponding to portion 46 of the transmission function is 0 or opaque since the addition of the amplitudes of the corresponding portions of the pulse trains of FIG. 3b, FIG. 3c, FIG. 3d, will be −1, +1 and 0 as shown. Portion 28 of the transmission function is +1 because the corresponding portions of the 3 pulse trains are +1 (FIG. 3b) −1 (FIG. 3c) and +1 (FIG. 3d).

The parameters A, B, and C are evaluated by considering the Fourier spectrum of the desired harmonic grating function of FIG. 3a corresponding to the specific example given. If P(X;A) is used to denote a pulse train of the type shown in FIG. 3b with a duty cycle of A, then the Fourier series expansion of P(X;A) is $$\sum_{n\ \text{ODD}}^{\infty} \frac{4}{n\pi} \text{SIN}(\tfrac{1}{2}n\pi A)\ \text{SIN}(n\pi X/L). \tag{1}$$

where $$L = \text{Half Period}$$

$$n = \text{Harmonic}$$

Since the grating transmission function of the example of FIG. 3a is the summation P(X;A)−P(X;B)+P(X;C) then the series expansion for the controlled harmonic grating is $$\sum_{n\ \text{ODD}}^{\infty} \frac{4}{n\pi} [\text{SIN}(\tfrac{1}{2}n\pi A) - \text{SIN}(\tfrac{1}{2}n\pi B) + \tag{2}$$

$$\text{SIN}(\tfrac{1}{2}n\pi C)]\ \text{SIN}(n\pi X/L).$$

In accordance with an embodiment of the invention, a plurality of simultaneous equations are set up by equating the bracketed portion of equation (2) to zero for each order n to be suppressed, and since three orders are suppressed in the example, the result is three equations having three 3 unknowns, i.e., A, B, and C. For the first equation, the bracketed portion of equation (2) is set equal to 0 where n is 3 since the third order is being suppressed; for the second equation where the bracketed material of the equation (2) is equal to 0, n is made equal to 5, since the fifth order is being suppressed and for the third equation, the bracketed portion is set equal to 0, and n is 7, since the seventh order is being suppressed. These equations may be solved algebraically, or by computer search, to produce the proper values of A, B, and C. The parameters are then multiplied by the half period L to arrive at the three different pulse widths for the pulse trains of FIGS. 3b through FIG. 3d. The above stated techniques by which the three parameters A, B, and C are selected to satisfy the three equations are well known to the art and need not be further explained. It may be noted however, that A, B, and C are by definition between 0 and 1, and that A is greater than B, and B is greater than C by construction, so that a computer search of three dimensional parameter space may be readily performed in order to find the appropriate values of A, B, and C. The resulting values are then employed to construct the three pulse trains of FIGS. 3b and 3d which are thereafter summed to produce the grating function of FIG. 3a. It may also be noted that the binary pulse train of FIG. 3c is weighted with a −1 so that the restriction to binary magnitude and phase is obeyed.

So far, the method of the invention has been described in connection with a specific example in which the third, fifth and seventh harmonics have been suppressed. For the general case however, the number of pulse trains required, and hence the number of equations, and parameters to be derived, is equal to the number of harmonics or orders to be suppressed, except that all even harmonics are generally suppressed by symmetry, as is the case in the above stated example. The method of the invention may be also employed to enhance any selected order. For example, let it be assumed that the third order is to be enhanced. In this case, the bracketed portion of equation (2) would be set equal to a maximum amount rather than to 0, and since the third order is being enhanced, n is equal to three for this equation. The result would still be three equations with three unknowns, two of the equations being equated to zero, and one of which is equated to "maximum". The computer search will derive the proper three unknown parameters, and the process would be similar to the steps described above.

For the general case, the series expansion for the controlled harmonic grating is indicated by Equation (3):

$$\frac{2}{L} \sum_{n \text{ ODD}}^{\infty} \frac{2L}{n\pi} \left[ \sum_{l=1}^{Q} K_l \text{SIN}(\tfrac{1}{2} n\pi A_l) \right] \text{SIN}(n\pi X/L). \quad (3)$$

Where:
n = harmonic number
Q = number of controlled harmonics;
Al = duty cycle of the $l^{th}$ pulse train
The value of Kl is by definition −1 or +1; and the constraint $$\left| \sum_{l=1}^{P} K_l \right| \leq 1 \text{ For all } P \leq Q$$

ensures that the CGH has only the three transmission values +1, 0, −1.

A further constraint defined by equation (4): $K_l + K_{l+1} = 0$, ensures that the strips of phase retarding material have a width L. As before, a plurality of simultaneous equations are set up, equating the bracketed portion of equation (3) to 0 for each order n to be suppressed. For each order to be enhanced, the bracketed portion of equation (3) is set equal to "maximum", and a computer search is then performed to solve for the appropriate parameters.

In view of the foregoing, it should now be apparent that the fabrication method of the present invention is extremely flexible, whereby selected harmonics may be enhanced or suppressed through the use of the foregoing techniques.

In summary, because of the binary constraints applied during the calculation procedure, no extraordinary fabrication techniques are required. The magnitude transmission function can be created with any convenient metal coated through etched photo-resist and the phase retarding material may also be deposited through a photoresist. Since the edges of the phase steps always occur in an opaque region of the magnitude function, the need for very sharp precisely formed edges on the phase retarding layer is eliminated.

Numerous variations of the methods described above will be readily apparent to those skilled in the art and thus the scope of the invention is to be limited only by the language of the following claims and reasonable equivalents thereto. "Light transmissive areas" is intended to include light reflecting areas, and "light blocking areas" include non-reflecting areas, where a reflective grating is fabricated rather than a transmissive grating.

I claim:
1. A method of fabricating a controlled harmonic binary grating having both binary magnitude and phase transmissions in which specified harmonics are modified by enhancement or suppression, comprising the steps of:
   a. manifesting a plurality of binary pulse trains $P(X;A_1)$, $P(X;A_2)$, $P(X;A_3)$ . . . , which when summed, produce a series expansion having the form of equation (3) of the specification;
   b. setting up a plurality of simultaneous equations by equating the bracketed portion of equation (3) of the specification to zero for each order n to be suppressed, and to a maximum for each order n to be enhanced;
   c. solving for the parameters $A_1, A_2, A_3$ . . . including the constraint of equation (3);
   d. establishing the pulse widths of said plurality of binary pulse trains in accordance with the solved parameters of step c;
   e. summing said plurality of binary pulse trains resulting from performing step d to produce a transmission function of said binary grating;
   f. utilizing said transmission function to construct said grating.

2. The method of claim 1 wherein the terms within the bracket of equation (3) of the specification also obey the constraint of equation (4) of the specification.

3. The method of claim 2 wherein light transmissive areas are formed upon said grating which correspond to the positive and negative portions of said transmission function and light blocking areas are formed upon said grating in accordance with the portions of said transmission function where the ordinate of said transmission function equals 0.

4. The method of claim 3 further including applying phase retarding elements to said grating in accordance with the relative phase of portions of said transmission function.

5. The method of claim 4 wherein said phase retarding elements are formed upon said grating to cause the edge portions thereof to overlay light blocking portions of said grating.

6. The method of claim 1 wherein light transmissive areas are formed upon said grating which correspond to the positive and negative portions of said transmission function and light blocking areas are formed upon said grating in accordance with the portions of said transmission function where the ordinate of said transmission function equals 0.

7. The method of claim 6 further including applying phase retarding elements to said grating in accordance with the relative phase of portions of said transmission function.

8. The method of claim 7 wherein said phase retarding elements are formed upon said grating to cause the edge portions thereof to overlay light blocking portions of said grating.

9. A method of fabricating a controlled binary grating having both binary magnitude and phase transmissions in which specified harmonics are modified by enhancement or suppression comprising the steps of:
   a. manifesting a plurality of binary pulse trains $P(X;A)$, $P(X;B)$, and $P(X;C)$, each having a Fourier series expansion of equation (1) of the specification, which when said pulse trains are summed, produce a series expansion having the form of equation (2) of the specification;

b. setting up plurality of simultaneous equations by equating the bracketed portion of equation (2) of the specification to zero for each order n to be suppressed, and to a maximum for each order n to be enhanced;

c. solving for the parameters A, B, C;

d. establishing the pulse widths of said plurality of binary pulse trains in accordance with the solved parameters A, B, and C;

e. summing said plurality of binary trains resulting from performing step d to produce a transmission function of said binary grating;

f. utilizing said transmission function to construct said grating.

10. The method of claim 9 wherein the terms within the bracketed portion of equation (2) have alternate signs.

11. The method of claim 10 wherein light transmissive areas are formed upon said grating which correspond to the positive and negative portions of said transmission function and light blocking areas are formed upon said grating corresponding to the portions of said transmission function where the ordinate of said transmission function equals 0.

12. The method of claim 11 further including applying phase shifting means to said grating in accordance with the relative phase of portions of said transmission function.

13. The method of claim 12 wherein said phase shifting means are positioned upon said grating to cause the edge portions of said phase shifting means to overlay light blocking portions of said grating.

14. The method of claim 13 wherein said phase shifting means are positioned upon said grating by applying layers of phase retarding material upon said grating.

15. The method of claim 9 wherein light transmissive areas are formed upon said grating which correspond to the positive and negative portions of said transmission function and light blocking areas are formed upon said grating corresponding to the portions of said transmission function where the ordinate of said transmission function equals 0.

16. The method of claim 15 further including applying phase shifting means to said grating in accordance with the relative phase of portions of said transmission function.

17. The method of claim 16 wherein said phase shifting means are positioned upon said grating to cause the edge portions of said phase shifting means to overlay light blocking portions of said grating.

18. The method of claim 17 wherein said phase shifting means are positioned upon said grating by applying layers of phase retarding material upon said grating.

19. A controlled harmonic grating made in accordance with the method of any one of claims 1, 2, 6, 7, 8, 9, 10, 15, 16, 17, 18, 3, 4, 5, 11, 12, 13 or 14.

* * * * *